United States Patent
Ding

(10) Patent No.: US 6,632,555 B2
(45) Date of Patent: Oct. 14, 2003

(54) PROTON ELECTROLYTE MEMBRANE FUEL CELL WITH ANTI-FREEZE COOLANT AND HUMIDIFIERS

(75) Inventor: Yi Ding, Canton, MI (US)

(73) Assignee: Ballard Power Systems Inc., Burnaby (CA)

( * ) Notice: Subject to any disclaimer, the term of this patent is extended or adjusted under 35 U.S.C. 154(b) by 159 days.

(21) Appl. No.: 09/861,450

(22) Filed: May 18, 2001

(65) Prior Publication Data

US 2002/0172848 A1 Nov. 21, 2002

(51) Int. Cl.⁷ .......................... H01M 8/00; H01M 8/04; H01M 8/12; H01M 8/10; H01M 2/00; H01M 2/02
(52) U.S. Cl. ............... 429/30; 429/13; 429/17; 429/26; 429/34
(58) Field of Search ............... 429/13, 17, 20, 429/24, 25, 26, 30, 34

(56) References Cited

U.S. PATENT DOCUMENTS

| | | | |
|---|---|---|---|
| 3,923,546 A | | 12/1975 | Katz et al. |
| 5,248,566 A | | 9/1993 | Kumar et al. |
| 5,605,770 A | | 2/1997 | Andreoli et al. |
| 5,776,624 A | | 7/1998 | Neutzler |
| 5,798,186 A | | 8/1998 | Fletcher et al. |
| 5,876,571 A | * | 3/1999 | Buck ..................... 204/157.15 |
| 5,965,288 A | | 10/1999 | Okamoto |
| 5,996,976 A | | 12/1999 | Murphy et al. |
| 6,040,073 A | | 3/2000 | Okamoto |
| 6,045,934 A | * | 4/2000 | Enami ......................... 429/30 |
| 6,068,941 A | | 5/2000 | Fuller et al. |
| 6,106,964 A | * | 8/2000 | Voss et al. ..................... 429/20 |
| 6,284,399 B1 | * | 9/2001 | Oko et al. ..................... 429/19 |
| 6,416,891 B1 | * | 7/2002 | Condit et al. .................. 429/13 |
| 6,416,895 B1 | * | 7/2002 | Voss et al. ..................... 429/20 |
| 6,471,195 B2 | * | 10/2002 | Shimanuki et al. ......... 521/43.5 |

* cited by examiner

Primary Examiner—Randy Gulakowski
Assistant Examiner—Donald V. Scaltrito
(74) Attorney, Agent, or Firm—Seed IP Law Group PLLC

(57) ABSTRACT

A fuel cell system comprising a closed coolant path within a fuel cell; a humidifier comprising a humidification fluid flow path and a fuel and air gas supply passage continuous in, through and out of the humidifier; the humidification fluid flow path and the fuel and air gas supply passage separated by a water permeable membrane that is impervious to organic materials allowing water from the humidification fluid flow path to enter the fuel and air gas supply passage; and the humidifier connected to the fuel cell by a humidified air and fuel passageway. The water permeable membrane can be a keggin ion pillared $\alpha$-ZrP composite material. The coolant can be water and organic material mixture, such as glycol, thus allowing the coolant flow in temperatures below the freezing point.

16 Claims, 2 Drawing Sheets

PROTON ELECTROLYTE MEMBRANE FUEL CELL WITH ANTI-FREEZE COOLANT AND HUMIDIFIERS

BACKGROUND OF THE INVENTION

1. Field of the Invention

The present invention relates generally to proton electrolyte membrane (PEM) fuel cells and specifically to a method and apparatus for cooling and humidifying fuel cells using anti-freeze coolant.

2. Discussion of the Prior Art

In an effort to find new energy sources, fuel cells using an electrochemical reaction to generate electricity are becoming an attractive energy alternative. Fuel cells offer low emissions, high fuel energy conversion efficiencies, and low noise and vibrations. U.S. Pat. No. 5,248,566 to Kumar et al. These advantages make fuel cells useful in automotive applications. Of the various types of fuel cell types, the proton electrolyte membrane (PEM) fuel cell appears to be the most suitable for use in automobiles, as it can produce potentially high energy, but has low weight and volume.

Solid PEM fuel cells are well known in the prior art and generally employ a membrane electrode assembly (MEA) that consists of electrodes contained in an anode compartment and a cathode compartment separated by a solid polymer electrolyte membrane. The MEA for each fuel cell is sandwiched between a pair of electrically conductive elements. These elements serve as current collectors for the electrodes (anode and cathode). They contain an array of grooves in their faces for distributing the fuel cells' gaseous reactants over the surfaces of the respective anode and cathode. The MEA contains a layer of catalyst at each membrane/electrode interface to induce the desired electrochemical reaction.

In operation, the electrodes are electrically coupled. When coupled, the electrodes provide a circuit for conducting electrons between the electrodes through an external circuit.

Two or more fuel cells can be electrically connected together in series to increase the overall power output of the assembly. Such a multiple fuel cell arrangement is referred to as a fuel cell stack. The stack typically includes inlet ports and manifolds for directing a fluid fuel stream and a fluid oxidant stream to the individual fuel cell reactant flow passages.

The fuel cell stack also commonly includes an inlet port and manifold for directing a coolant fluid stream, typically water, to interior passages within the stack to absorb heat generated by the fuel cell during operation.

The stack also generally includes exhaust manifolds and outlet ports. The ports are needed to expel the depleted reactant streams, reaction products such as water, and an exhaust manifold and outlet port for the coolant stream exiting the stack.

Each reactant stream exiting the fuel cell stack generally contains water. The outlet fuel stream from the anodes generally also contains water added to humidify the stream plus any product water drawn across the membrane from the cathode. The outlet oxidant stream from the cathodes generally contains water added to humidify the stream plus product water formed at the cathode.

In fuel cells it would initially appear that since water is the product of the reaction, sufficient water would be already present. Unfortunately, the water formed in a fuel cell is inadequate to maintain membrane hydration except under special conditions. Each proton that moves through the membrane drags at least two or three water molecules with it. As the current density increases, the number of water molecules moved through the membrane also increases. Eventually, the flux of water being pulled through the membrane by the proton flux exceeds the rate at which water is replenished by diffusion. At this point, the membrane begins to dry out, and its internal resistance increases. This sets a relatively low limit on the current density that can be maintained by back diffusion from the cathode surface.

The need to add water (humidify) to support proton conduction has been addressed in a number of ways. See generally, U.S. Pat. No. 5,996,976 to Murphy et al. Use of a solid polymer (or composite polymer-inorganic material) membrane has been developed to humidify the fuel cell accordingly.

The presence of water in the fuel cell system, especially in an automotive application in a cold climate, creates design challenges. The water in the fuel cell used for cooling and humidification can freeze when not in use. At a minimum, the ice would need to be melted prior to operation to resolve this problem. This requires energy, impeding the goal of reduced fuel consumption. Further, the expansion of the water during freezing could expand and damage the fuel cell system.

Various methods and devices have been proposed in the prior art for addressing the freezing problem. U.S. Pat. No. 5,798,186 to Fletcher et al. discloses a method for starting the fuel below the freezing temperature of water and allowing the exothermic fuel cell reaction to raise the stack core temperature above the freezing temperature of water.

U.S. Pat. Nos. 5,965,288 and 6,040,073 to Okamoto disclose a solution to the fuel cell freezing problem using independent passageways. This requires the use of water as well as a second medium. The inventions do not address the related problem of keeping the water from freezing.

U.S. Pat. No. 6,068,941 to Fuller et al. describes a method for protecting a PEM fuel cell in a freezing environment by introducing a controlled amount of a low molecular weight alcohol, such as methanol or ethanol, into the coolant passages upon shutdown of the fuel cell in order to prevent water trapped therein from freezing. Upon start-up, air is fed into the cathode reactant flow field and the alcohol diffuses to the cathode catalyst where it is oxidized, thus heating the fuel cell to a normal operating temperature. This method will prevent water trapped in a fuel cell from freezing but will undesirably increase system complexity.

All known prior art retain, to some degree, a pure water channel. Accommodating freezing conditions are thus complex. There remains a need for an improved fuel cell coolant and humidifying system that can accommodate freezing temperatures during periods of non-use without increase in system complexity or loss of system efficiency.

SUMMARY OF THE INVENTION

Accordingly, an object of the present invention is to provide an improved PEM fuel cell power plant that eliminates the need for pure water channels.

Specifically, the present invention is a proton electrolyte membrane (PEM) fuel cell system having a closed coolant path within the fuel cell; a humidifier comprising a humidification fluid flow path and a fuel and air gas supply passage continuous in, through and out of the humidifier; the humidification fluid flow path and the fuel and air gas supply passage separated by a water permeable membrane that is impervious to organic materials allowing water from the humidification fluid flow path to enter the fuel and air gas supply passage; and the humidifier connected to the fuel cell by a humidified air and fuel passageway. The water permeable membrane can be a polymer, an inorganic polymer or be made of functional materials such as keggin ions pillared α-ZrP composite materials.

In one embodiment, the coolant path can be configured to include a coolant pump and a heat exchanger. The coolant can be a water and organic material mixture (using, for example glycol) thus allowing coolant flow in temperatures below freezing point.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which.

DETAILED DESCRIPTION OF THE PREFERRED EMBODIMENT

The present invention relates to fuel cell systems, and more specifically to an improved proton electrolyte membrane PEM fuel cell power plant that eliminates the need for pure water channels. The present invention uses anti-freeze containing coolants known in the prior art for the fuel cell coolant and humidifying systems, thus preventing the freezing complications normally associated with fuel cell systems. The coolant can be a mixture of water and glycol.

The invention further includes a membrane that allows water passage but is impermeable to the organic materials such as glycol in the humidifying system. A gas supply passage is formed on one side surface of the water permeable membrane, and a humidifying water passage is formed on the other side surface of the membrane, where the exchange of the humidifies occurs. The water permeable membrane can be a polymer or a polymer-inorganic membrane impermeable to organic molecules but permeable to water. Specific membrane material polymers, inorganic polymers, or other materials like keggin ions pillared α-ZrP composite materials have the properties required.

Figure 1:
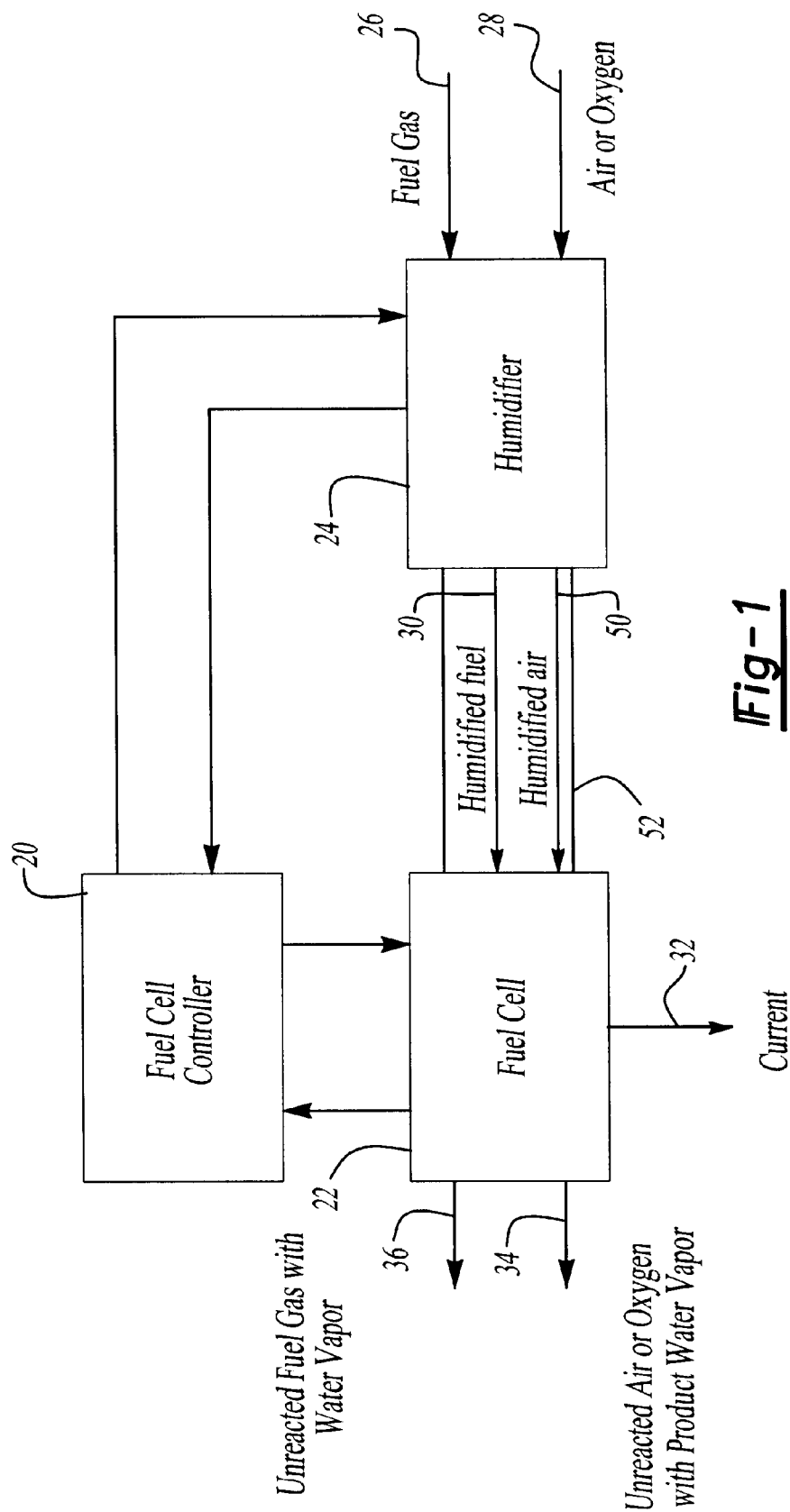
FIG. 1 illustrates a general schematic of a fuel cell system with humidity controller.

To better understand the present invention, FIG. 1 illustrates a general schematic of a fuel cell system with a humidity controller. In FIG. 1, a fuel cell controller 20 controls a fuel cell 22 (such as a fuel cell stack) and a fuel cell humidifier 24. The fuel cell humidifier 24 receives a fuel gas 26 such as hydrogen, and air or oxygen mixture 28 from the atmosphere to provide oxygen to the system. The fuel gas 26 and air or oxygen mixture 28 are humidified in the humidifier 24 and delivered to the fuel cell 22 as humidified fuel 30 and humidified air 50 through a humidified air and fuel passageway 52. A flow rate and pressure meter (not shown) controls the flow rate and mixtures of the fuel gas 26 and air or oxygen 28. The humidified fuel 30 once received by the fuel cell 22, generates current 32, unreacted air or oxygen with product water vapor 34, and unreacted fuel gas with water vapor 36.

Figure 2:
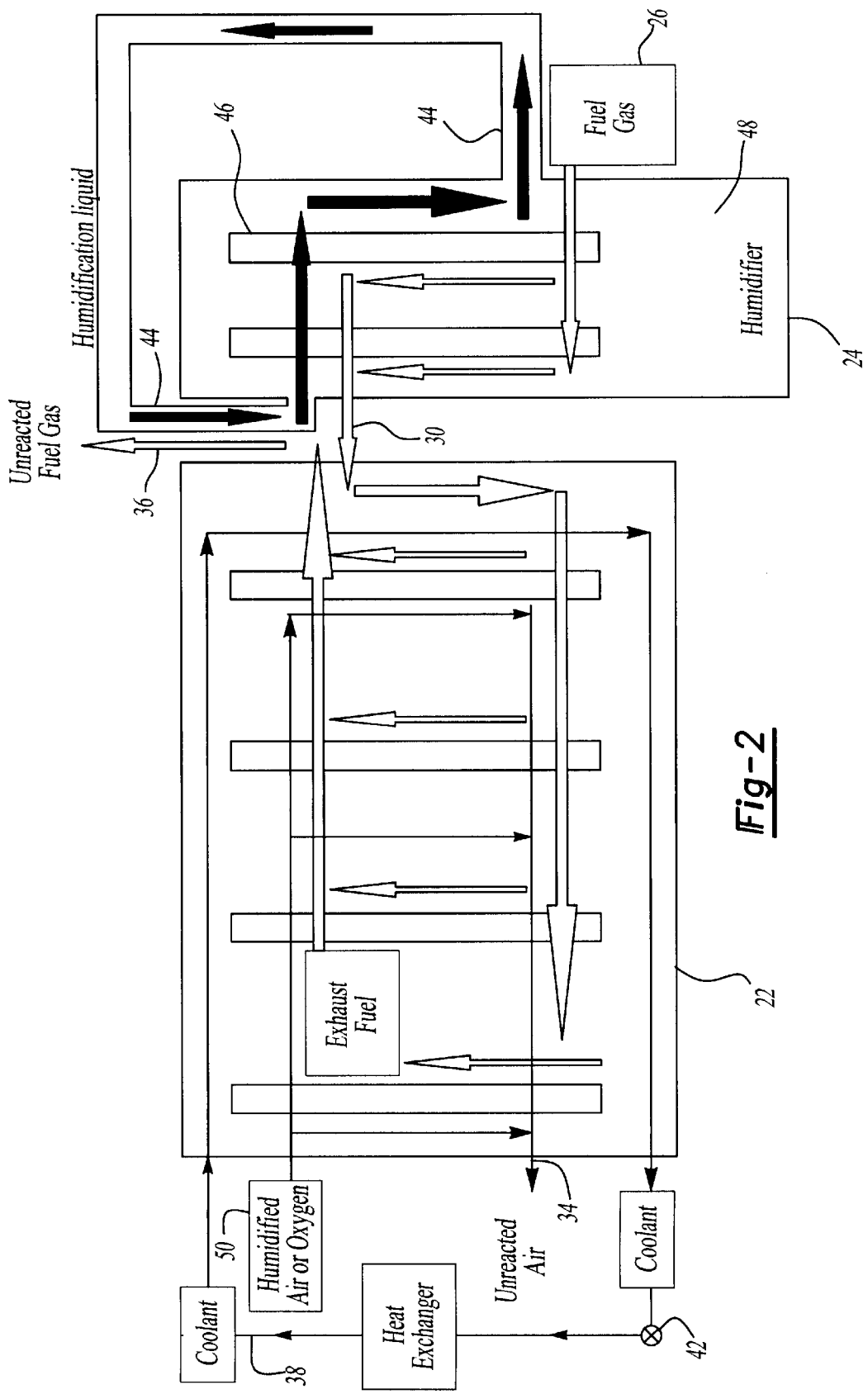
FIG. 2 adds detail to the fuel cell humidifier for humidifying oxygen-containing gas.

FIG. 2 adds more detail to the fuel cell 22 and fuel cell humidifier 24 shown in FIG. 1. Specifically, two fluid systems are added, one for cooling the fuel cell 22, the other to humidify air or oxygen 28 and gas 26. To simplify the illustration, only humidification of the fuel gas 26 is demonstrated, though the illustration can be used for air or oxygen 28 as well.

In the fuel cell 22, a fuel cell coolant path 38 is added. The fuel cell coolant path 38 is a closed path within the fuel cell 22 stack; therefore, the coolant may be water but may also contain an organic component that has a freezing point below pure water such as a water and glycol mixture. By way of example only, a heat exchanger 40 (such as a radiator that vents heat from the coolant to the atmosphere) and a coolant pump 42 can be added to increase the amount of cooling.

The humidifier 24 in FIG. 2 adds a humidification fluid flow path 44. This path is not entirely closed. It allows the passage of water through a membrane 46 to a fuel and air gas supply passage 48 continuous in, through and out of the humidifier. As described above, the membrane 46 allows passage of water from the humidification fluid flow path to enter the fuel and air gas supply passage but is impervious to organic materials such as glycol containing antifreeze. Again, membrane materials like polymers, inorganic polymers, and keggin ions pillared α-ZrP composite materials have required properties. This allows the use of antifreeze such as a water and glycol combination to be used in the humidification process.

The above-described embodiment of the invention is provided purely for purposes of example. Many other variations, modifications, catalysts, and applications of the invention may be made.

I claim:

1. A proton electrolyte membrane (PEM) fuel cell system, comprising:
   a fuel cell comprising a closed coolant path;
   a humidifier comprising a humidification fluid flow path and a fuel and air gas supply passage continuous in, through and out of the humidifier;
   the humidification fluid flow path and the fuel and air gas supply passage separated by a water permeable membrane that is impervious to organic materials allowing water from the humidification fluid flow path to enter the fuel and air gas supply passage;
   the humidifier connected to the fuel cell by a humidified air and fuel passageway.

2. The fuel cell system of claim 1 wherein the closed coolant path further comprises a coolant pump.

3. The fuel cell system of claim 1 wherein the closed coolant path further comprises a heat exchanger.

4. The fuel cell system of claim 1 wherein the closed coolant path further comprises coolant that comprises water and organic components and has a freezing point below water.

5. The fuel cell system of claim 1 wherein the fuel cell system is a fuel cell stack.

6. The fuel cell system of claim 1 wherein the water permeable membrane is a keggin ions pillared α-ZrP composite material.

7. The fuel cell system of claim 1 wherein the water permeable membrane is a polymer.

8. The fuel cell system of claim 1 wherein the water permeable membrane is an inorganic polymer.

9. A system to cool and humidify a proton electrolyte membrane (PEM) fuel cell system configured to operate at below the freezing temperature of water, comprising the steps of:

cooling the fuel cell in a closed coolant path using a coolant that comprises water and organic components and has a freezing point below water;

humidifying fuel cell fuel and air comprising the steps of:
flowing a coolant that comprises water and organic components and has a freezing point below water through a humidification fluid flow path within a humidifier;
flowing fuel and air in, through and out of the humidifier through a fuel and air gas supply passage;
separating the humidification fluid flow path and the fuel and air gas supply passage with a water permeable membrane that is impervious to organic materials allowing water from the humidification fluid flow path to enter the fuel and air gas supply passage; and
connecting the fuel cell and the humidifier by a humidified air and fuel passageway.

10. The method of claim 9 wherein the closed coolant path further comprises the step of pumping coolant through the closed coolant path.

11. The method of claim 9 wherein the closed coolant path further comprises the step of exchanging heat from the coolant to the atmosphere using a heat exchanger.

12. The method of claim 9 wherein the closed coolant path further comprises coolant that comprises water and organic components and has a freezing point below water.

13. The method of claim 9 wherein the fuel cell system is a fuel cell stack.

14. The method of claim 9 wherein the water permeable membrane is a keggin ions pillared α-ZrP composite material.

15. The method of claim 9 wherein the water permeable membrane is a polymer.

16. The method of claim 9 wherein the water permeable membrane is an inorganic polymer.

* * * * *